US008078510B2

(12) United States Patent
Ge et al.

(10) Patent No.: US 8,078,510 B2
(45) Date of Patent: Dec. 13, 2011

(54) METHOD, SYSTEM AND SERVER FOR CHARGING A PREPAID ACCOUNT

(75) Inventors: Shengping Ge, Shenzhen (CN); Lei Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 137 days.

(21) Appl. No.: 12/272,361

(22) Filed: Nov. 17, 2008

(65) Prior Publication Data

US 2009/0070248 A1 Mar. 12, 2009

Related U.S. Application Data

(63) Continuation of application No. PCT/CN2007/071149, filed on Nov. 29, 2007.

(30) Foreign Application Priority Data

Dec. 26, 2006 (CN) .......................... 2006 1 0157745

(51) Int. Cl.
*G06Q 40/00* (2006.01)

(52) U.S. Cl. ................. 705/34; 705/40; 705/41; 705/42

(58) Field of Classification Search .................... 705/34, 705/40–42
See application file for complete search history.

(56) References Cited

U.S. PATENT DOCUMENTS

2002/0103762 A1 8/2002 Lopez et al.
2002/0116338 A1 8/2002 Gonthier et al.

FOREIGN PATENT DOCUMENTS

| | | |
|---|---|---|
| CN | 1447579 | 10/2003 |
| CN | 1859534 | 11/2006 |
| CN | 1996858 | 7/2007 |
| EP | 1 395 003 A2 | 3/2004 |
| KR | 20010069701 | 7/2001 |
| WO | WO 03/026268 A2 | 3/2003 |
| WO | WO 03/058943 A1 | 7/2003 |

OTHER PUBLICATIONS

European Search Report for European Application No. 07817339.0, mailed Apr. 23, 2009 Huawei Technologies C., LTD 4 pgs.

European Patent Office Communication pursuant to Article 94(3) EPC, European search opinion for Application No. 07 817 339.0, mailed May 18, 2009, Huawei Technologies C., LTD 7 pgs.

(Continued)

*Primary Examiner* — Daniel S Felten
(74) *Attorney, Agent, or Firm* — Finnegan, Henderson, Farabow, Garrett & Dunner LLP

(57) ABSTRACT

The present invention relates to prepaid services in the communication field. A method for charging a prepaid account includes: delivering the available traffic to the NAS based on the available balance of an account shared by the user and other users in response to a successful authentication of a user's access request; and delivering the available traffic to the NAS based on the available balance of the account shared by the user and other users in response to a receipt of an Accounting-Request-Interim message from the NAS. The solution provided by the invention may deliver the available traffic to a user every accounting period so that an account can be used by multiple users concurrently, whereas overdraft does not occur. The present invention also provides a system and an AAA server for charging a prepaid account.

13 Claims, 3 Drawing Sheets

OTHER PUBLICATIONS

Written Opinion of the International Searching Authority dated (mailed), issued in related Application No. PCT/CN2007/071149, filed, Huawei Technologies C., LTD (10 pages.

First Chinese Office Action dated (mailed) Mar. 7, 2008, issued in related Chinese Application No. 200610157745.4 Huawei Technologies C., LTD (13 pages).

Second Chinese Office Action dated (mailed) Dec. 5, 2008, issued in related Chinese Application No. 200610157745.4 Huawei Technologies C., LTD (15 pages).

Third Chinese Office Action dated (mailed) Aug. 7, 2009, issued in related Chinese Application No. 200610157745.4 Huawei Technologies C., LTD (13 pages).

Rejection Decision dated (mailed) Feb. 5, 2010, issued in related Chinese Application No. 200610157745.4 Huawei Technologies C., LTD (16 pages).

Chiba et al., Dynamic Authorization Extensions to Remote Authentication Dial in User Service (Radius), Network Working Group, Request for Comments: 3576, Category: Informational, Jul. 2003, (27 pages).

METHOD, SYSTEM AND SERVER FOR CHARGING A PREPAID ACCOUNT

This application is a continuation of International Application No. PCT/CN2007/071149, filed on Nov. 29, 2007, which claims priority to Chinese Patent Application No. 200610157745.4, filed with the Chinese Patent Office on Dec. 26, 2006 and entitled "Method, System and Server for Charging a Prepaid Account", both of which are incorporated herein by reference in their entireties.

FIELD OF THE INVENTION

The present invention relates to prepaid services in the communication field, and in particular, to a method, system and server for charging a prepaid account.

BACKGROUND OF THE INVENTION

With the refined service operations of authentication, authorization and accounting (AAA), operators may propose various new requirements, such as one card for multiple applications, to enhance the user satisfaction and competitiveness. One card for multiple applications means that a user can enable multiple users to use the card at the same time. This is very convenient for some specific user groups. One card for multiple applications is applicable to postpaid users. Because it is a postpaid service, no overdraft case may occur. No matter how many users are using a card, the account is rated and charged based on the actual traffic. For a prepaid account, there is a balance limit. The AAA server should budget the available traffic and send it to the network access server (NAS). After the available traffic is used up, the NAS stops providing services to the user.

FIG. 1 shows the Internet access process of a prepaid account over the standard Radius protocol.

Step 101: A user performs PPP/PPOE/802.1X dialing on a terminal (TM).

Step 102: After receiving the dialing request, the NAS sends a Radius Access-Request to the AAA server.

Step 103 to step 104: After receiving the Radius Access-Request, the AAA server authenticates the user. If the authentication fails, the AAA server sends an Access-Reject message; if the authentication succeeds, the AAA server calculates the available traffic of the user based on the balance of the account. If the available traffic is greater than 0, the AAA server returns a Radius Access-Accept message to the NAS, and the available traffic is the actual calculation result. If the available traffic is equal to 0, the AAA server returns an Access-Reject message, and the available traffic is delivered through the Access-Accept message;

Step 105: After receiving the Access-Accept message, the NAS notifies the TM of successful dialing and opens the Internet access authority for the user. The authentication process ends.

Step 106 to step 107: Upon successful authentication, the NAS sends an Accounting-Request-Start message to the AAA server, and the AAA server returns an accounting start response message directly.

Step 108 to step 110: The NAS sends an Accounting-Request-Interim message to the AAA server periodically, and the AAA server settles fees, deducts fees and generates bills based on the user's actual traffic and the accounting policy preset on the AAA server, and returns an interim accounting response message.

Step 111 to step 115: If the user gets offline actively or the available traffic delivered by the AAA server is used up, the NAS sends an Accounting-Request-End message to the AAA server; the AAA server settles fees, deducts fees and generates bills based on the user's actual traffic and the accounting policy preset on the AAA server, and returns an accounting end response message to the NAS; the NAS notifies the TM of getting offline successfully. The Internet access process of the user ends.

It is evident that the available traffic is calculated based on the balance of an account. The preceding process supports the standard Radius protocol, where the available traffic is delivered with the Access-Accept message and remains unchanged. During the invention, the inventor discovers the following problem: If multiple users use a same card and each user gets online by using the preceding process, the AAA server may calculate the available traffic based on the balance of the account of each user. In this case, if each user gets offline only when the available traffic is used up, the fee is not enough and overdraft may occur. Thus, when the standard Radius protocol is used, a prepaid account cannot be used by multiple users.

SUMMARY OF THE INVENTION

An embodiment of the prevent invention provides a method, a system and an AAA server for charging a prepaid account so that a prepaid account can be used by multiple users.

A method for charging a prepaid account provided in an embodiment of the prevent invention includes:

after a user's access request is authenticated successfully, delivering the available traffic to the NAS based on the available balance of an account shared by the user and other users; and after an Accounting-Request-Interim message is received from the NAS, delivering the available traffic to the NAS based on the available balance of the account shared by the user and other users.

An AAA server provided in an embodiment of the prevent invention includes:

a receiving unit, adapted to receive an authentication request and an Accounting-Request-Interim message sent by the NAS when an accounting period start;

a processing unit, adapted to calculate a user's communication fees in a specific number of accounting periods, and compare the relationship between the available balance of an account shared by the user and other users and the communication fees in the specific number of accounting periods when receiving the Accounting-Request-Interim message; and a transmitting unit, adapted to deliver the available traffic in the specific number of accounting periods to the NAS when the available balance of the account is greater than or equal to the communication fees in the specific number of accounting periods.

A system for charging a prepaid account provided in an embodiment of the present invention includes:

a NAS, adapted to send an authentication request and an Accounting-Request-Interim message to the AAA server when an accounting period starts; and an AAA server, adapted to calculate the communication fees in a specific number of accounting periods, compare the relationship between the available balance of an account and the communication fees in the specific number of accounting periods when receiving the Accounting-Request-Interim message, and deliver the available traffic in the specific number of accounting periods to the NAS when the available balance of the account is greater than or equal to the communication fees in the specific number of accounting periods.

It is evident that a prepaid account may be used by multiple users concurrently and overdraft may not occur if the available traffic is delivered to each user by time segment in each accounting period.

An embodiment of the prevent invention provides a method, a system and an AAA server for charging a prepaid account so that a prepaid account can be used by multiple users.

A method for charging a prepaid account provided in an embodiment of the prevent invention includes:

after a user's access request is authenticated successfully, delivering the available traffic to the NAS based on the available balance of an account shared by the user and other users; and after an Accounting-Request-Interim message is received from the NAS, delivering the available traffic to the NAS based on the available balance of the account shared by the user and other users.

An AAA server provided in an embodiment of the prevent invention includes:

a receiving unit, adapted to receive an authentication request and an Accounting-Request-Interim message sent by the NAS when an accounting period start;

a processing unit, adapted to calculate a user's communication fees in a specific number of accounting periods, and compare the relationship between the available balance of an account shared by the user and other users and the communication fees in the specific number of accounting periods when receiving the Accounting-Request-Interim message; and a transmitting unit, adapted to deliver the available traffic in the specific number of accounting periods to the NAS when the available balance of the account is greater than or equal to the communication fees in the specific number of accounting periods.

A system for charging a prepaid account provided in an embodiment of the present invention includes:

a NAS, adapted to send an authentication request and an Accounting-Request-Interim message to the AAA server when an accounting period starts; and an AAA server, adapted to calculate the communication fees in a specific number of accounting periods, compare the relationship between the available balance of an account and the communication fees in the specific number of accounting periods when receiving the Accounting-Request-Interim message, and deliver the available traffic in the specific number of accounting periods to the NAS when the available balance of the account is greater than or equal to the communication fees in the specific number of accounting periods.

It is evident that a prepaid account may be used by multiple users concurrently and overdraft may not occur if the available traffic is delivered to each user by time segment in each accounting period.

DETAILED DESCRIPTION OF THE INVENTION

Figure 1:
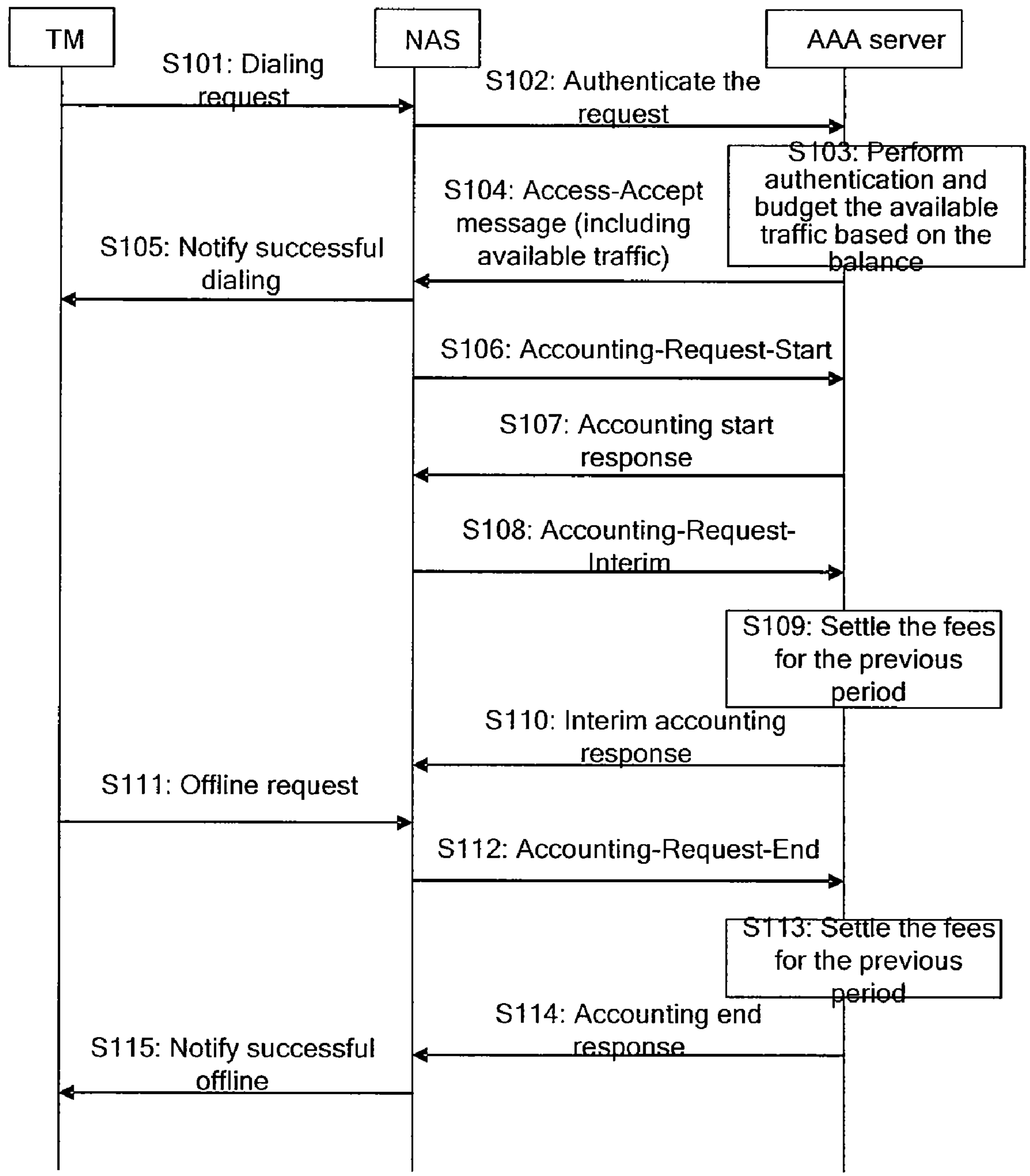
FIG. 1 shows the process of charging a prepaid account.
Figure 2:
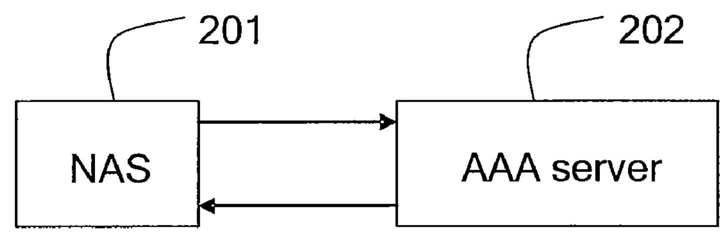
FIG. 2 shows a system in which multiple users use the same prepaid account according to an embodiment of the present invention.

An embodiment of the present invention provides a system in which multiple users use a same prepaid account. As shown in FIG. 2, the system includes a NAS 201 and an AAA server 202. The NAS 201 is adapted to receive a dialing request message from a TM, send an Access-Request, an Accounting-Request-Start message, and an Accounting-Request-Interim message to the AAA server, and notify the TM of getting offline successfully. The AAA server 202 is adapted to: receive the Access-Request and perform authentication; if the authentication succeeds, calculate and reserve the available service for the next period; if the available traffic is greater than 0, return the Access-Accept message to the NAS, with the Access-Accept message including the available traffic and accounting period; if the authentication fails or the available traffic for the next period is 0, send an Access-Reject message to the NAS, and terminate the process; after the authentication succeeds, receive the Accounting-Request-Start message, return the accounting start response message; receive the Accounting-Request-Interim message, settle the communication fees for the previous period, reserve the available traffic for the next period, deliver the available traffic to the NAS through change of authorization (CoA); receive the Accounting-Request-End message, settle fees, and return an accounting end response to the NAS till the end of the Internet access process. The available traffic is the available service time (also the interim accounting period) plus a deviation time. The deviation time can support the NAS to send an Accounting-Request-Interim message to the AAA server upon the end of an accounting period.

Figure 3:
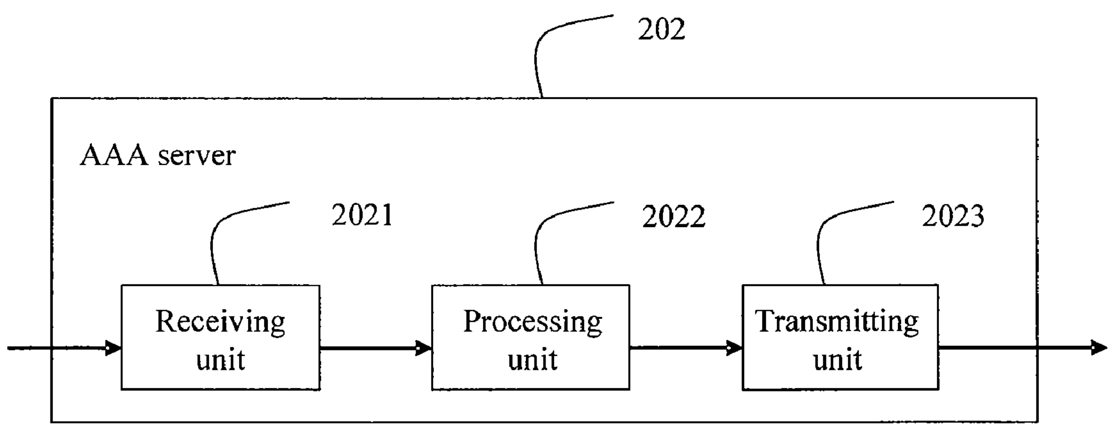
FIG. 3 shows an AAA server according to an embodiment of the present invention.

An embodiment of the present invention provides the structure of an AAA server. As shown in FIG. 3, the AAA server includes a receiving unit 2021, a processing unit 2022 and a transmitting unit 2023. The receiving unit 2021 is adapted to receive an Access-Request, an Accounting-Request-Start message, an Accounting-Request-Interim message, and an Accounting-Request-End message. The processing unit 2022 is adapted to authenticate, calculate and reserve the communication fees for the next period, settle the fees for the previous period, and reserve the available service time for the next period. The transmitting unit 2023 is adapted to send an Access-Reject message or Access-Accept message, wherein the Access-Accept message includes the available service time and accounting period, send an accounting start response message, deliver the available service time through the CoA message, and send an accounting end response.

Figure 4:
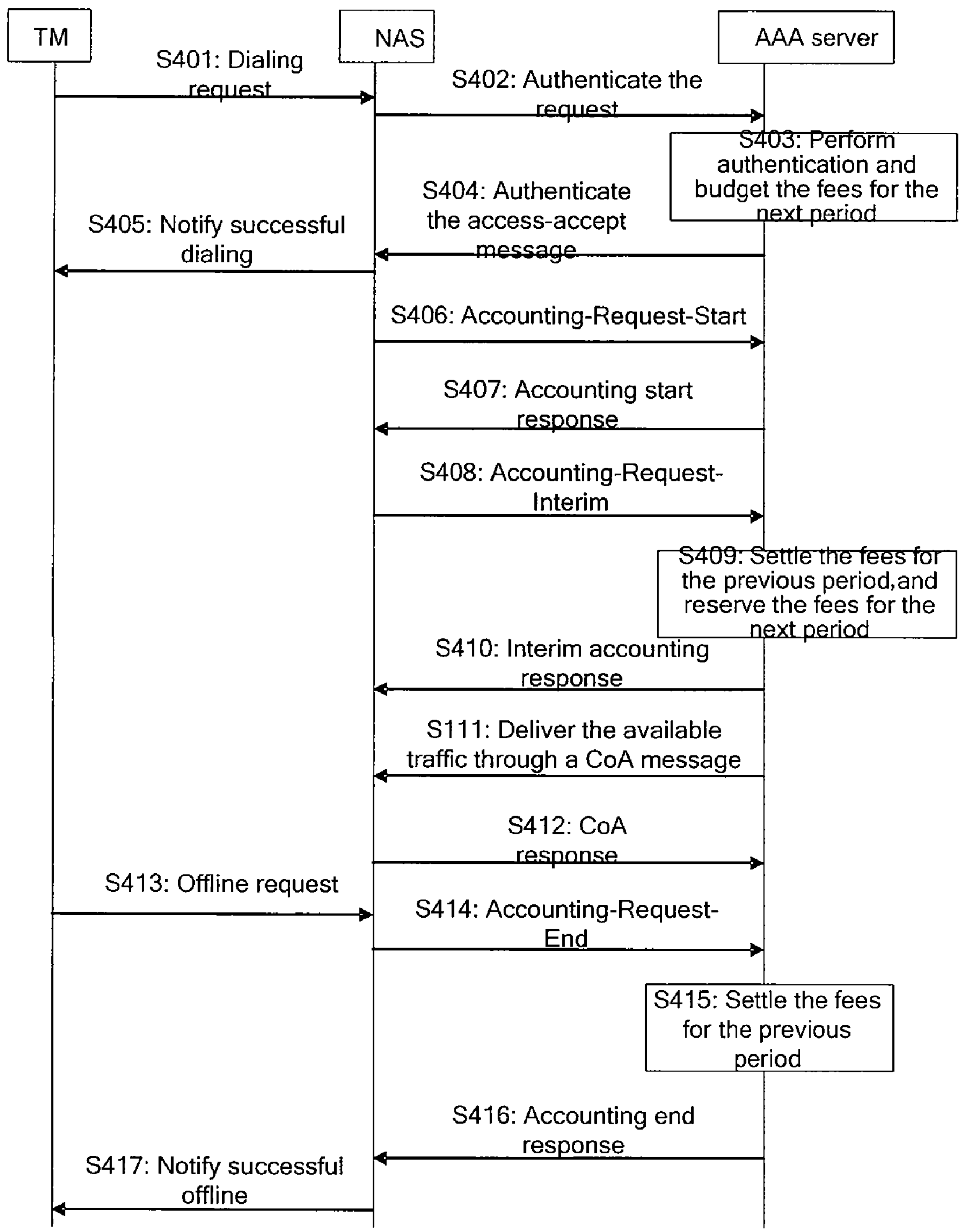
FIG. 4 shows the process of charging a prepaid account that is used by multiple users according to an embodiment of the present invention.

FIG. 4 shows the process of charging a prepaid account that is used by multiple users. The process includes the following steps:

Step 401 to step 402: A user performs PPP/PPOE/802.1X dialing on a TM. After receiving a dialing request message, the NAS sends a Radius Access-Request carrying such information as user name and password to the AAA server.

Step 403 to step 405: After receiving the Radius Access-Request message, the AAA server authenticates the user. If the authentication fails, the AAA server sends an Access-Reject message to the NAS; if the authentication succeeds, the AAA server calculates communication fees required for an accounting period, where the accounting period refers to an interim accounting period that is configurable on the AAA server and delivered to the NAS by using the Access-Accept message, and notifies the NAS to report the Accounting- Request-Interim message every interim accounting period. If the accounting period is short, few fees are reserved for each period, but there are many Accounting-Request-Interim messages; if the accounting period is long, more fees are reserved for each period, and there are few Accounting-Request-Interim messages, but few users can use the service. Considering the preceding two factors, a period may be 15 minutes in practical applications.

If the available balance of an account is enough, that is, the available balance is greater than or equal to the communication fees required for the next accounting period, and the AAA server reserves fees for the next period, the AAA server returns a Radius Access-Accept message carrying available traffic time to the NAS. The available traffic time is equal to the sum of an accounting period plus a deviation, where the deviation may be configured on the AAA server, for example, one minute. With this deviation, the NAS can report the Accounting-Request-Interim message, thus making the accounting process more accurate.

If the available balance of the account is not enough, that is, the available balance of the account is greater than 0 but smaller than the communication fees required for the next accounting period, and the AAA server can reserve some fees only, the user's available service time is determined according to the reserved fees. If the available service time is greater than 0, the AAA server returns a Radius Access-Accept message, with the actual budget as the available service time; if the available service time is equal to 0, the AAA server returns an Access-Reject message.

After receiving the Access-Accept message, the NAS notifies the TM of successful authentication and opens Internet access authority for the user. The authentication process ends.

Step 406 to step 407: Upon successful authentication, the NAS sends an Accounting-Request-Start message to the AAA server, and the AAA server returns an accounting-response message directly.

The following process is performed on the basis that the available service time is greater than an accounting period:

Step 408 to step 412: After the interim accounting period starts, the NAS sends an Accounting-Request-Interim message to the AAA server. The AAA server settles fees, deducts fees and generates bills based on the user's actual traffic and the accounting policy preset on the AAA server, and reserves fees for the next period. If the fees are reserved successfully, the AAA server delivers the sum of an accounting period plus a deviation as the available service time to the NAS through a CoA request message; if no enough fees are reserved, the AAA server delivers the actually reserved fees as the available service time to the NAS through the CoA request message. After receiving the CoA request message, the NAS re-adjusts the available access time of the user based on the available service time in the message, and sends a CoA response to the AAA server. Because the available service time is delivered through the CoA message, the property list of which may carry the available service time for delivery to the NAS, the preceding process may be performed so long as the NAS and the AAA server can support the CoA message over the Radius protocol. In this way, the devices of different manufacturers may be interconnected, facilitating operators to maintain the devices, increasing the customer service response speed, and reducing the network maintenance and operation costs of operators.

If the user does not get offline actively, step 408 to step 412 may be repeated until the balance is used up, that is, the delivered available service time is used up.

Step 413 to step 417: If the user gets offline actively or the NAS receives a CoA message with the available service time being 0 from the AAA server, the NAS sends an Accounting-Request-End message to the AAA server; the AAA server settles fees, deducts fees and generates bills based on the user's actual traffic and the accounting policy preset on the AAA server, and returns an accounting-response to the NAS; the NAS notifies the TM of getting offline successfully. The Internet access process of the user ends.

When an account is used by multiple users, the process is the same as the preceding process. One-period fees are reserved for one user only so that users are forced to get offline when the reserved fees are used up. In this case, a prepaid account may be used by multiple users, whereas overdraft does not occur.

In the preceding process, the available traffic may be the available service time, or available traffic flow, or combination thereof. When the available traffic includes the available traffic flow, the process is similar to the preceding process except that the Radius protocol is extended and the available traffic flow is added to the CoA message.

For better understanding of the method for charging a prepaid account that is used by multiple users concurrently, the following gives an example that a prepaid account with an amount of RMB 10 is used by three users and the available traffic is the available service time, where the amount is converted into 100 minutes of available Internet access time according to the specified rate, the interim accounting period preset by the AAA server is 15 minutes, and the deviation time is one minute.

At the beginning, user A sends an Internet access request, and the AAA server authenticates the request. After the authentication succeeds, the AAA server finds that the communication fees for an accounting period are RMB 1.5 by calculation and the balance of the account is RMB 10. The AAA server reserves fees for the next period and delivers the available service time of 16 minutes (equal to an interim accounting period of 15 minutes plus the deviation time of one minute) to the NAS through an Access-Accept message. After receiving the Access-Accept message, the NAS notifies user A of successful authentication and opens the Internet access authority for user A.

After five minutes when user B sends an Internet access request, the AAA server authenticates the request. After the authentication succeeds, the AAA server finds that the available balance of the account is RMB 8.5, and reserves fees for the next period, that is, it delivers the available service time of 16 minutes to the NAS through an Access-Accept message. After receiving the Access-Accept message, the NAS notifies user B of successful authentication and opens the Internet access authority for user B.

After 15 minutes when the interim accounting period for user A starts, the NAS sends an Accounting-Request-Interim message to the AAA server. The AAA server finds that the available balance of the account is RMB 7, and reserves fees for the next period, that is, it delivers the available service time of 16 minutes (equal to an interim accounting period of 15 minutes plus the deviation time of one minute) to the NAS through the CoA message.

After 20 minutes when the interim accounting period for user B starts, the NAS sends an Accounting-Request-Interim message to the AAA server. The AAA server finds that the available balance of the account is RMB 5.5 and reserves fees for the next period, that is, it delivers the available service time of 16 minutes (equal to an interim accounting period of 15 minutes plus the deviation time of one minute) to the NAS through the CoA message.

After 21 minutes when user C sends an Internet access request, the AAA server authenticates the request. After the authentication succeeds, the AAA server finds that the available balance of the account is RMB 4 and reserves fees for the next period, that is, it delivers the available service time of 16 minutes to the NAS through an Access-Accept message. After receiving the Access-Accept message, the NAS notifies user C of successful authentication and opens an Internet access authority for user C.

After 30 minutes when the interim accounting period for user A starts, the NAS sends an Accounting-Request-Interim message to the AAA server. The AAA server finds that the available balance of the account is RMB 2.5 and reserves fees for the next period, that is, it delivers the available service time of 16 minutes (equal to an interim accounting period of 15 minutes plus the deviation time of one minute) to the NAS through the CoA message.

After 32 minutes when user A sends an offline request to the NAS, the NAS sends an Accounting-Request-End message to the AAA server. The AAA server finds by calculation that the current available balance of the account is RMB 2.3 based on the available balance of the account and actual fees of user A, and returns an accounting-response to the NAS. The NAS notifies user A of getting offline successfully, and the Internet access process of user A ends.

After 35 minutes when the interim accounting period for user B starts, the NAS sends an Accounting-Request-Interim message to the AAA server. The AAA server finds that the available balance of the account is RMB 2.3, and reserves fees for the next period, that is, it delivers the available service time of 16 minutes (equal to an interim accounting period of 15 minutes plus the deviation time of one minute) to the NAS through the CoA message.

After 36 minutes when the interim accounting period for user C starts, the NAS sends an Accounting-Request-Interim message to the AAA server. The AAA server finds that the available balance of the account is RMB 0.8, that is, the available balance of the account is not enough for reserving fees for the next period, the AAA server finds by calculation that the actual available service time is 8 minutes based on the current available balance of RMB 0.8, and delivers the available service time of 8 minutes to the NAS through the CoA message.

After 44 minutes when the NAS finds that the available service time of user C is used up, the NAS sends an Accounting-Request-End message to the AAA server. The AAA server finds that the current available balance of the account is 0, and returns an accounting-response to the NAS. The NAS notifies user C of getting offline successfully. The Internet access process of user C ends.

After 50 minutes when the interim accounting period for user B starts, the NAS sends an Accounting-Request-Interim message to the AAA server. The AAA server finds that the current available balance of the account is 0 and delivers the available service time of 0 to the NAS through the CoA message. After receiving the CoA message, the NAS sends an Accounting-Request-End message to the AAA server. The AAA server returns an accounting-response to the NAS, and the NAS notifies user B of getting offline successfully. The Internet access process of user B ends.

In the preceding embodiments, after an Accounting-Request-Interim message is received, if the available balance of the account is greater than or equal to the communication fees for an accounting period, the available traffic for an accounting period is delivered, that is, communication fees for an accounting period are reserved for a user. It is understandable by those skilled in the art that the preceding embodiments may be extended to reserve communication fees for multiple accounting periods, that is, if the available balance of the account is greater than or equal to communication fees for multiple periods, the available traffic for multiple accounting periods are delivered. In a word, the AAA server may reserve communications fees for a specific number of accounting periods, that is, it delivers the available traffic for a specific number of accounting periods to a user.

Besides, after authenticating a user's access request, the AAA server may follow the practice as described in the preceding embodiments, that is, it compares the available balance of the account with the communication fees in an accounting period, and then delivers the available traffic according to the comparison result, or calculates the actual available traffic according to the available balance of the account directly, and then delivers the calculated actual available traffic.

It is apparent that those skilled in the art can make various modifications and variations to the invention without departing from the spirit and scope of the invention. The present invention is intended to cover these modifications and variations provided that they fall in the scope of protection defined by the following claims or their equivalents.

What is claimed is:

1. A method for charging a prepaid account, comprising:

reserving, by an authentication, authorization, and accounting (AAA) server, fees for one accounting period and delivering, available traffic for the accounting period, for a user who sends a Radius Access-Request message, to a network access server (NAS) based on an available balance of a prepaid account shared by the user and other users in response to a successful authentication of the user's access request when the available balance of the prepaid account is greater than or equal to the communication fees required for the one accounting period; and delivering, by the AAA server, the available traffic for the next accountinq period for the user to the NAS based on the available balance of the prepaid account shared by the user and other users in response to a receipt of an Accounting-Request-Interim message from the NAS when the available balance of the prepaid account is qreater than or equal to the communication fees required for the next accountinq period.

2. The method of claim 1, wherein the delivering the available traffic to the NAS based on the available balance of the prepaid account shared by the user and other users is realized via a change of authorization (CoA) message.

3. The method of claim 1, wherein the delivering the available traffic to the NAS based on the available balance of the account shared by the user and other users further comprises:

calculating, by the AAA server, the actual available traffic for the next accounting period for the user based on the available balance of the prepaid account, when the available balance of the prepaid account shared by the user and other users is greater than 0 and smaller than the communication fees required for the next accounting period ; and delivering the actual available traffic to the NAS.

4. The method of claim 1, wherein the available traffic is the available service time and/or available traffic flow.

5. The method of claim 1, wherein when the available traffic comprises available service time, the available service time of for the one accounting period that is delivered by the NAS is equal to the sum of the one accounting and a deviation time, wherein the deviation time is used to support the NAS in sending the Accounting-Request-Interim message to the AAA server upon the end of an accounting period.

6. An authentication authorization and accounting (AAA) server, comprising:

a receiving unit, adapted to receive an authentication request from a network access server (NAS) and an Accounting-Request-Interim message when an accounting period starts;

a processing unit, adapted to calculate a user's communication fees in a specific number of accounting periods and compare the relationship between the available balance of an account shared by the user and other users and the communication fees in the specific number of accounting periods when receiving the Accounting-Request-Interim message; and a transmitting unit, adapted to deliver the available traffic when the available balance is greater than or equal to the communication fees in the specific number of accounting periods .

7. The server of claim 6, wherein when the available balance of the account is greater than 0 and smaller than the communication fees in the specific number of accounting periods, the transmitting unit is adapted to deliver the actual available traffic that is calculated based on the available balance of the account to the NAS.

8. The server of claim 6, wherein when the available traffic comprises the available service time, the available service time in the specific number of accounting periods delivered to the NAS is equal to the sum of the specific number of one accounting periods plus a deviation time, where the deviation time can support the NAS in sending the Accounting-Request-Interim message to the AAA server upon the end of an accounting period.

9. The server of claim 6, wherein the specific number of accounting periods is an accounting period.

10. A system for charging a prepaid account, comprising:

a network access server, adapted to send an authentication request and an Accounting-Request-Interim message to an AAA server upon the end of an accounting period; and an AAA server, adapted to calculate a user's communication fees in the specific number of accounting periods, compare the relationship between the available balance of an account and the communication fees in the specific number of accounting periods when receiving the Accounting-Request-Interim message, and deliver the available traffic in the specific number of accounting periods to a NAS when the available balance of the account is greater than or equal to the communication fees in the specific number of accounting periods.

11. The system of claim 10, wherein the AAA server is further adapted to deliver the actual available traffic that is calculated based on the available balance of the account to the NAS when the available balance of the account is greater than 0 and smaller than the communication fees in the specific number of accounting periods.

12. The system of claim 10 wherein when the available traffic comprises the available service time, the available service time in the specific number of accounting periods that the AAA server delivers to the NAS is equal to the sum of the specific number of accounting periods plus a deviation time, where the deviation time can support the NAS in sending the Accounting-Request-Interim message to the AAA server upon the end of an accounting period.

13. The system of claim 11, wherein when the available traffic comprises the available service time, the available service time in the specific number of accounting periods that the AAA server delivers to the NAS is equal to the sum of the specific number of accounting periods plus a deviation time, where the deviation time can support the NAS in sending the Accounting-Request-Interim message to the AAA server upon the end of an accounting period.

* * * * *